No. 834,291. PATENTED OCT. 30, 1906.
J. H. GAULT.
PROCESS OF DRAWING BLANKS.
APPLICATION FILED AUG. 15, 1905.

3 SHEETS—SHEET 1.

Witnesses:
Henry Drury
M. M. Hamilton

Inventor:
John H. Gault

No. 834,291. PATENTED OCT. 30, 1906.
J. H. GAULT.
PROCESS OF DRAWING BLANKS.
APPLICATION FILED AUG. 15, 1905.
3 SHEETS—SHEET 2.
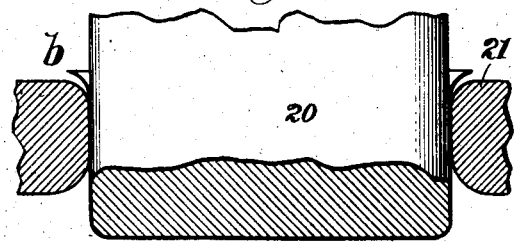
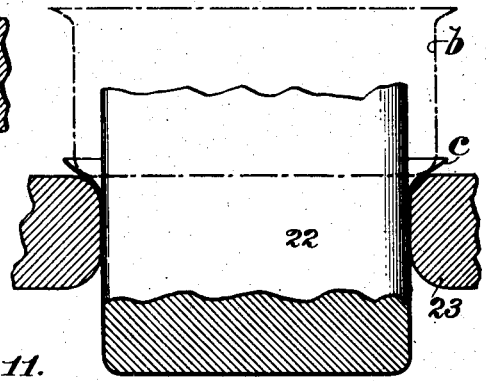
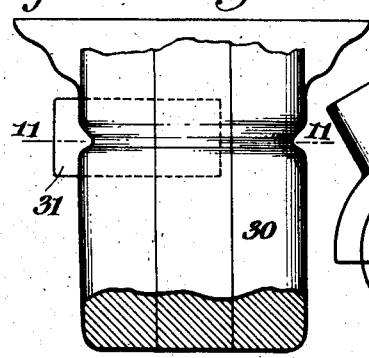
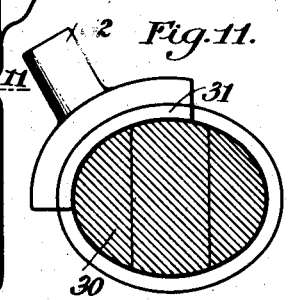
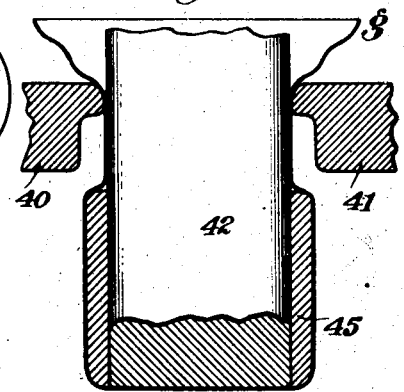
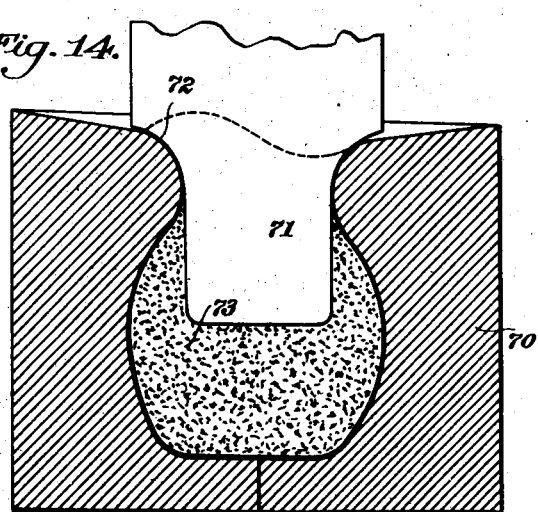
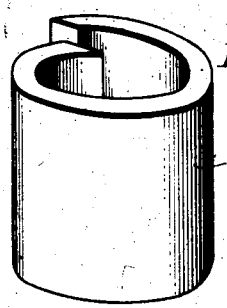
Witnesses:
Inventor:

No. 834,291.  
PATENTED OCT. 30, 1906.  
J. H. GAULT.  
PROCESS OF DRAWING BLANKS.  
APPLICATION FILED AUG. 15, 1905.  
3 SHEETS—SHEET 3.

Witnesses:  
Inventor:

UNITED STATES PATENT OFFICE.

JOHN H. GAULT, OF PHILADELPHIA, PENNSYLVANIA, ASSIGNOR TO THE INTERNATIONAL SILVER COMPANY, A CORPORATION OF NEW JERSEY.

PROCESS OF DRAWING BLANKS.

No. 834,291.  Specification of Letters Patent.  Patented Oct. 30, 1906.

Application filed August 15, 1905. Serial No. 274,265.

*To all whom it may concern:*

Be it known that I, JOHN H. GAULT, a citizen of the United States, residing at Philadelphia, county of Philadelphia, and State of Pennsylvania, have invented a new and useful Improvement in the Process of Drawing Blanks, of which the following is a full, clear, and exact description, reference being had to the accompanying drawings, which form a part of this specification.

The object of my invention is to form from a flat sheet of metal a vessel of irregular outline, particularly a vessel whose diameter for any part of its length diminishes from beneath upwardly and whose sides flare outwardly at the top. As an example of such a vessel may be mentioned a cream-pitcher, which from its bottom upwardly first increases in diameter, then decreases, and then increases to form the top flare.

My invention consists in a process of manipulating the sheet metal by means of which the stated object is effected.

Figure 15:
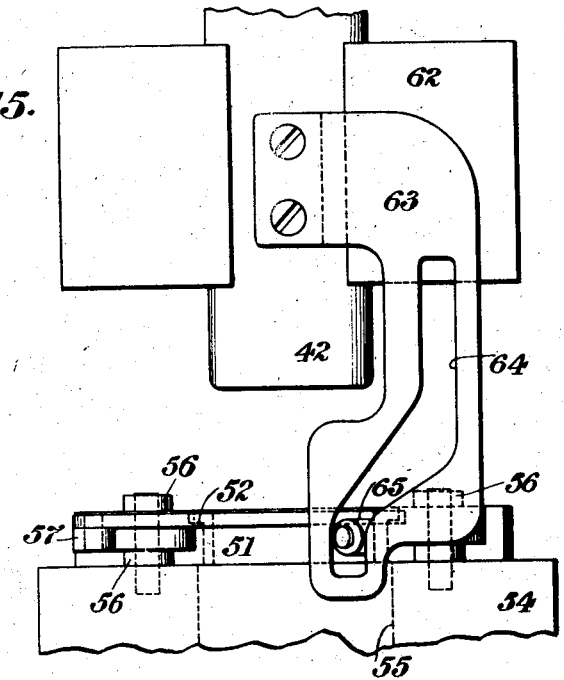
Figure 16:
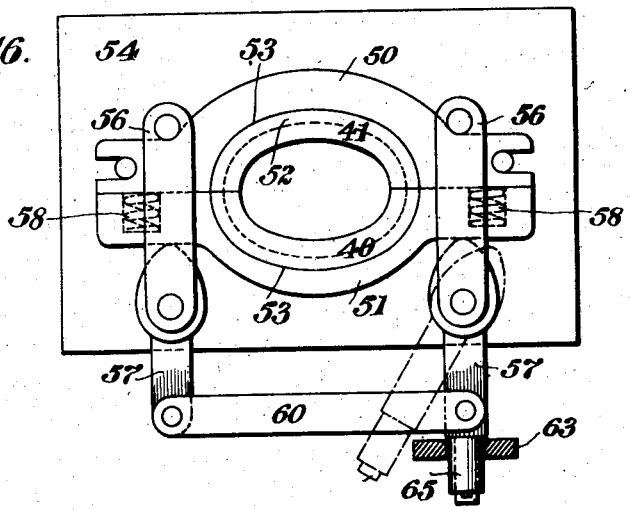

In the drawings, Figures 1-7 are sectional diagrams showing the different forms assumed by the blank at the ends of the several successive operations. Fig. 8 is a sectional elevation of die, blank, and punch, showing the first operation. Fig. 9 is a similar view showing the second operation. Fig. 10 is a sectional elevation of blank and dies, showing the grooving operation. Fig. 11 is a section on the line 11 11, Fig. 10. Fig. 12 is a sectional elevation of blank, die, punch, and filler, showing the drawing operation following the grooving operation. Fig. 13 is a perspective view of the filler. Fig. 14 is a vertical section of blank and expanding and forming dies, showing the final operation. Fig. 15 is a front elevation of press, sectional die, and automatic mechanism for opening and closing the die. Fig. 16 is a plan view of said die and operating mechanism.

It is old and well known to form cylindrical or oval receptacles from flat sheet metal, the process consisting in subjecting the metal to successive punching operations by means of female dies of progressively-decreasing diameters, and punches or male dies, respectively, corresponding in diameter to the female dies, the first operation being to convert the flat sheet into a shallow blank of comparatively great diameter, and the subsequent operations decreasing its diameter and increasing its depth. The first step in my process consists in a modification of this process, which differs therefrom in that in some or all of the operations the metal is not forced by the punch wholly into or through the die, the result being that at the end of the successive operations the blank is of uniform diameter from near its bottom upwardly for a greater or less distance, while the top of the vessel flares outwardly.

Figure 1:
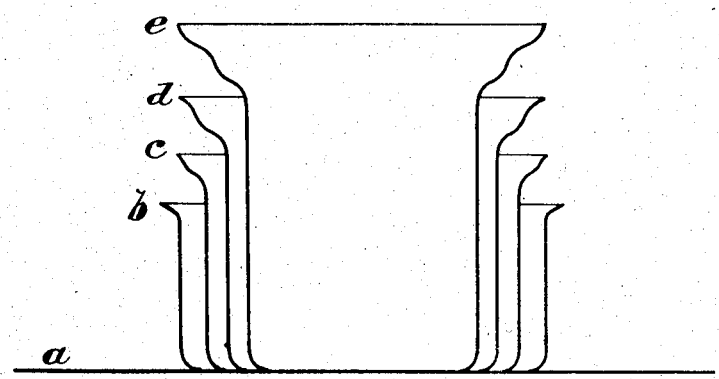

In Fig. 1, *a*, *b*, *c*, *d*, and *e* illustrate, respectively, the initial sheet and the successive shapes to which the initial sheet is drawn.

In Fig. 8 is illustrated diagrammatically the operation by which *b* is formed, 20 being the punch and 21 the die. The punch and the blank are shown in their lowermost positions.

In Fig. 9 is illustrated diagrammatically the operation by which *c* is formed, 22 being the punch and 23 the die. It is unnecessary to illustrate the punches and dies more in detail, as their construction and operation are well known in the art, nor is it necessary to illustrate the operations by which *d* and *e* are formed, as such illustrations would differ from Figs. 8 and 9 only in respect to the dimensions of the die and punch.

The next step in the process consists in forming a circumferential groove in the blank *e* on a line corresponding substantially to the distance above the bottom at which it is desired that the wall of the completed vessel shall begin to slope inwardly. This groove may be formed in any well-known manner, my invention not being limited to any particular way of forming it. If the blank is of a true circular form, the groove may be formed by turning it in a lathe. If the blank is oval in form or otherwise irregularly shaped, the groove may be formed as follows, (see Figs. 10 and 11:) Within the blank opposite the line along which the groove is to be formed is placed a three-part die 30, shaped to conform to the interior dimension of the blank and grooved to a depth at least as great as the depth of the groove to be formed.

Figure 2:
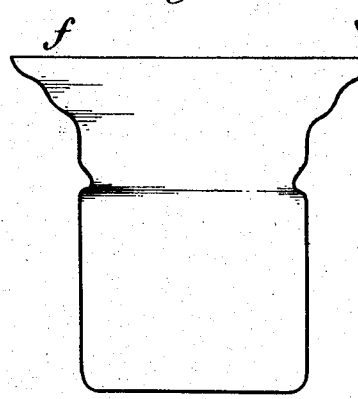

31 is a concave die (shown in detail in Fig. 11) having a projection corresponding in height and shape to the depth and shape of the groove to be formed. The die has a handie 32 to permit it to be manipulated by hand. The die 31 is concaved lengthwise to conform to the convexity of a portion of the outer wall of the blank. If the blank is oval in shape, the die 31 may conform to one of the four equal quarter-sections of the circumference of the blank, although, preferably, it should be somewhat longer, so that in the operation about to be described the die in one operation may somewhat overlap the groove formed in the previous operation. The die 31 is pressed against the blank successively at different points about its circumference, forcing the body of the metal into the groove of the die 30, thus forming a circumferential groove in the blank. A blank so grooved is shown in Fig. 2 and designated $f$.

Figure 3:
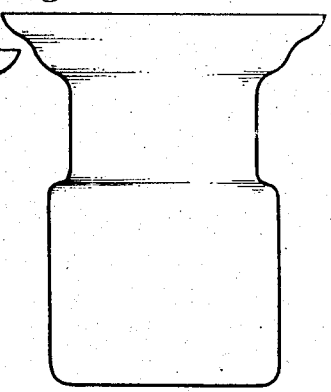
Figure 4:
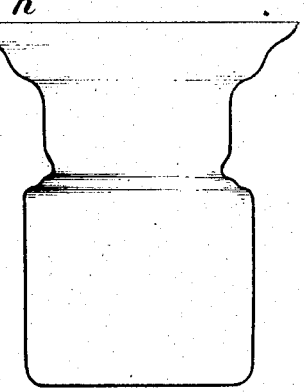
Figure 5:
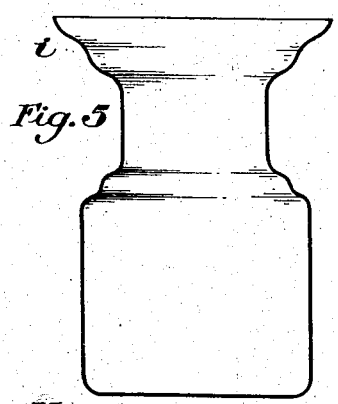
Figure 6:
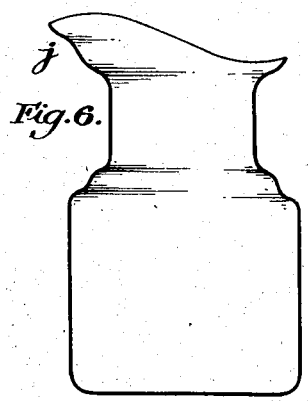
Figure 7:
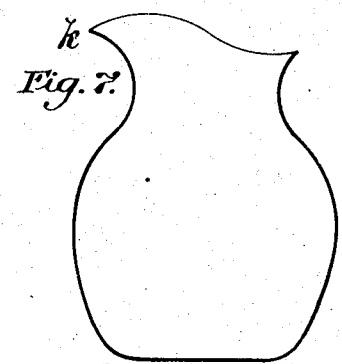

The next step in the process consists in inserting the blank within a two-part female die 40 41, (see Figs. 12, 15, and 16,) which rests with the groove so formed and substantially corresponds in diameter with the diameter of the grooved section of the vessel. The blank so held in the groove is then subjected to a punching operation similar to the operations set forth in describing the first step of the process, preferably only that part of the blank between the groove and the top flare being drawn through the die, the result being that the shell will be contracted in diameter above the line corresponding to the base of the original groove. The shape of the blank after this operation is indicated in Fig. 3 by reference-letter $g$. If necessary, the blank $g$ may be again grooved, as shown in Fig. 4, the groove being located on a line approximately immediately above and adjacent to the base of the original groove, and the blank $h$ so formed is placed within a second two-part die of a diameter adapted to fit the second groove and subjected to another punching operation to form the blank $i$, (see Fig. 5,) whose shape corresponds to that of blank $g$, except that the inward flare is longer and deeper and the part above the flare still more contracted.

In order to prevent distortion of that part of the blank beneath the groove while carrying out the operation or operations forming the last-described step in the process, it is desirable to insert within the vessel $f$ a split ring 45, (shown in detail in Fig. 13,) preferably of leather or rawhide, which is of a thickness equal to the depth of the groove and of a height equal to the distance between the groove and the bottom of the blank and shaped on its outside face to conform to the wall of the blank. The split ring 45 is preferably of such length that when placed within the blank, as shown in Fig. 12, it will form a practically continuous filling-piece. It will be understood that when the filler is so placed within the blank the latter will present to the punch 42 beneath the base of the groove a smooth wall substantially corresponding in diameter to the diameter of the punch itself. Any suitable filler may be substituted for the split ring.

The next step in the process consists in shearing or trimming off the top of the blank to give it a shape corresponding to that of the top of a pitcher or similar vessel in which the mouth projects outwardly beyond the remainder of the top. The blank so trimmed is indicated by the reference-letter $j$ in Fig. 6. The blank $j$ so formed is then placed within a two-part expanding-die 70, corresponding in shape to the shape of the completed vessel shown in Fig. 14. The expanding-die may be partly filled with potter's clay or other readily-displaceable substance 73, which when the punch 71 is forced within the die will be displaced, so as to fill the blank below a horizontal plane intersecting its smallest diameter and force this part of the blank against the inner wall of the die and impart to it a shape corresponding thereto. The punch may be provided with an annular lip 72, whose under side corresponds in shape to the shape of the outwardly-flared part of the die, thereby smoothing out the corrugations formed in the flare of the blank during the initial operations and imparting to the flare its ultimate shape. The completed vessel so formed is indicated by the reference-letter $k$ in Fig. 7.

In Figs. 15 and 16 I have shown automatic mechanism for operating the sectional die 40 41. 50 51 represent a two-part strong metallic die-holder, the part 50 being bolted to the base 54. Each die-holder section is provided with semicircumferential opposing cut-away portions 53, forming, when the sections are abutted, an orifice for the passage of the punch 42. Each die-holder section is also provided with a semicircumferential die-seat or inset 52 for the reception of the corresponding die-section. The base 54 is also provided with an orifice 55 for the passage of the punch. 56 56 are braces or straps bolted at one end to the base 54 and extending across and beyond the die-holder and bolted to the pivots on which turn the levers 57 57. 58 58 are compression-springs, seated in orifices in die-section 51 and pressing against die-section 50 and tending to retract the former. 60 is a link connecting levers 57 57. It will be understood that when the levers 57 57 are swung so that their short ends recede from the movable die-holder section 51 the latter will recede from the fixed die-holder section 50 and that when the levers are swung back the movable die-holder section will be moved into contact with the fixed die-holder section, thereby opening and closing the sectional die 40 41.

It is desirable that the die-sections shall be in their retracted position before the punch commences to descend to permit the grooved blank to be inserted within the die, that the die shall close before the punch has actually entered the die, and that the die shall remain closed during the upward movement of the punch until the punch has been wholly withdrawn from the blank, thereby enabling the die to engage the wider lower part of the blank as the latter is carried up by the punch and strip the blank from the punch. It is therefore desirable that the die shall open during the comparatively short upward movement of the punch after it has been withdrawn from the blank. The following arrangement meets the requirements specified:

Secured to the head 62, carrying the punch 42, is a downwardly-extending arm 63, provided with slot 64, shaped as shown in Fig. 15.

65 is a roller on the outer end of one of the levers 57, the roller resting within the slot. When the punch is in the extreme upper position, the roller 65 rests within the lower part of the slot 64, and the levers 57 57 are held in such position that the movable die-section is retracted from the fixed die-section, permitting the insertion of the grooved blank. As the punch moves down the roller 65 rides up the inclined outer wall of the slot 64, thereby swinging the levers 57 57 into position to close the die. This is effected before the punch enters the die. During its passage through the die the roller 65 rides within the upper part of the slot 64, maintaining the die closed. Near the end of the upward movement of the punch the roller rides down the inclined inner wall of the slot 64, thereby swinging the levers 57 57 into position to open the die.

It may sometimes be possible to produce the entire flare at the top of the blank in the drawing operation following the grooving operation instead of in the first step of the process, or the flare may be produced partially in one step and partially in the other step, the flare in any event being produced by not forcing the blank wholly into or through the die.

In many vessels the flare at top of the completed vessel is of uniform shape and width around its entire circumference, in which case it is not necessary to trim off the top. In other vessels there is no top flare at all, and in forming such vessels the blank may at each punching operation be forced in the usual manner entirely through the die.

The operations of expanding the blank and smoothing and finally shaping its top flare need not be carried out in a single operation, but may be carried out in two or more successive operations; nor is it necessary to perform the said operations of trimming the top of the blank, forming, and finally shaping the top flare, and expanding the blank in any particular order, as these operations may be formed in any convenient sequence.

Having now fully described my invention, what I claim, and desire to protect by Letters Patent, is—

1. The process of forming vessels from sheet metal, which consists in drawing a blank into one or more dies, then grooving the blank, then inserting the grooved part of the blank within a die, and then drawing partly through the last-named die the part of the blank above said groove.

2. The process of forming vessels from sheet metal, which consists in successively drawing a blank into a plurality of dies of successively-decreasing diameters, the blank being drawn only partly through one or more or all of said dies to form an outwardly-flaring top, then forming a groove between the top and bottom of the blank, then inserting the grooved part of the blank within a sectional die, and then drawing through the sectional die a part of the blank above said groove, thereby forming a blank whose diameter is smallest between its top and bottom portions.

3. The process of forming vessels from sheet metal, which consists in drawing a blank partly but not wholly through one or more dies to form a blank having a vertical wall and an outwardly-flaring top, then grooving the blank between its top and bottom, then forcing a part of the blank above said groove through a die substantially corresponding in diameter to the diameter of the grooved part of the blank, and then expanding the blank to shape.

4. The process of forming vessels from sheet metal, which consists in drawing a blank partly, but not wholly, through one or more dies, then grooving the blank between its top and bottom and inserting a filling-piece beneath said groove and placing the blank within a die extending into said groove, and then forcing a part of the blank above said groove through the last-named die.

5. The process of forming vessels from sheet metal, which consists in drawing a blank into one or more dies, then grooving the blank, and then drawing a part of the blank through a die whose diameter substantially corresponds with the diameter of the grooved part of the blank, thereby forming a blank whose diameter is greater on one side of the line of the groove than on the other side thereof.

6. The process of shaping blanks, which consists in forming a groove in a partly-shaped blank and inserting the grooved part of the blank within a die, and then drawing a part of the blank through said die, thereby forming a blank whose diameter is greater on one side of the line of the groove than on the other side thereof.

7. The process of forming vessels, which consists in forming a groove in a partly-shaped blank, then inserting the grooved part of the blank within a die and placing a filling device within the blank on one side of said groove, and then drawing through said die, a part at least of the portion of the blank on the other side of said groove.

8. The process of forming vessels with flaring top and enlarged lower portions, which consists in drawing a blank partly, but not wholly, through one or more dies to decrease its circumference and flare its top, and then forcing a part of the blank between its top and bottom through one or more other dies to further decrease the circumference of its central portion.

9. The process of forming vessels from sheet metal, which consists in drawing a blank partly through one or more dies to decrease its circumference and flare its top, then grooving the blank between its bottom and flared top and inserting a filling-piece beneath the groove and successively expanding and contracting a two-part sectional die to permit the blank to be inserted within the die and enable it to be held by the die on the line of the groove, then forcing into the die a punch of diameter substantially corresponding with the diameter of the grooved portion of the blank, and subsequently expanding the blank to shape.

10. The process of forming vessels from sheet metal, which consists in drawing a metal sheet partly, but not wholly, through a die to form a blank of comparatively great diameter and small depth, having vertical sides and a short outwardly-flared top, then drawing the blank so formed partly through a smaller die, or a plurality of successively-smaller dies, thereby forming a blank of smaller diameter and greater depth and provided with a longer outwardly-flared top, then forming a groove in the blank between its top and bottom, then inserting within the blank, between said groove and bottom, a filling-piece of a thickness substantially corresponding to the depth of the groove, then inserting the blank, on the line of said groove, within a two-part sectional die, then drawing a part of the blank above said groove through the sectional die, thus forming a blank whose diameter is smallest between its top and bottom, then again grooving the blank, then similarly inserting a thicker filler, then similarly inserting the blank within a smaller two-part sectional die, then drawing a part of the blank above the last-named groove partly through the last-named die, and then inserting the blank within an expanding-die and expanding it to shape.

11. The process of forming vessels from sheet metal which consists in drawing a blank into one or more dies, then grooving the blank, and subsequently expanding the blank to shape.

12. The process of forming vessels from sheet metal, which consists in grooving a partly-shaped blank between its ends and subsequently expanding to shape the blank on one side of the groove and shaping the blank on the other side of the groove.

13. The process of forming vessels, which consists in first forming a cylindrical blank, then grooving the blank between its ends, and then expanding the blank to shape.

14. The process of forming vessels having expanded body and contracted neck portions, which consists in forming a groove in a partly-shaped blank at a point substantially corresponding with the location of the neck in the vessel to be formed, then inserting the grooved blank within the expanding-die and partly filling the blank with a readily-displaceable substance, and then applying pressure to the displaceable substance, thereby forcing the body portion of the blank against the inner wall of the expanding-die.

In testimony of which invention I have hereunto set my hand, at Philadelphia, on this 3d day of August, 1905.

JOHN H. GAULT.

Witnesses:
M. M. HAMILTON,
J. B. WOOD.